United States Patent [19]

Hitzky

[11] 4,279,283
[45] Jul. 21, 1981

[54] HIGH PERIMETER TREAD ELEMENT

[75] Inventor: Leon J. Hitzky, Bonneweg, Luxembourg

[73] Assignee: The Goodyear Tire & Rubber Company, Akron, Ohio

[21] Appl. No.: 102,049

[22] Filed: Dec. 10, 1979

[51] Int. Cl.³ .............................................. B60C 11/00
[52] U.S. Cl. .............................. 152/209 R; D12/136; 152/209 D
[58] Field of Search .......... 152/209 R, 209 D, 209 A, 152/209 WT, 209 NT; D12/136, 137, 138, 139, 140

[56] References Cited

U.S. PATENT DOCUMENTS

| D. 46,772 | 12/1914 | Kessler | D12/137 |
|---|---|---|---|
| D. 47,947 | 10/1915 | Christian | D12/137 |
| D. 53,279 | 5/1919 | Wiener | D12/137 |
| D. 61,553 | 10/1922 | Worth | 152/209 D |
| D. 242,239 | 11/1976 | Jones | D12/137 |
| 1,462,984 | 7/1923 | Schenuit | 152/209 R |
| 2,267,406 | 12/1941 | Krusemark | 152/209 R |
| 3,998,256 | 12/1976 | Verdier | 152/209 R |

*Primary Examiner*—Michael W. Ball
*Attorney, Agent, or Firm*—Frank Pincelli

[57] ABSTRACT

An improved pneumatic tire having a tread portion comprising of plurality of independent projections. Each independent projection has a configuration such that the perimeter of the projection is substantially greater than the diameter of a circle which circumscribes the projection.

6 Claims, 3 Drawing Figures

HIGH PERIMETER TREAD ELEMENT

The foregoing abstract is not to be taken as limiting the invention of this application, and in order to understand the full nature and extent of the technical disclosure of this application, reference must be made to the accompanying drawings in the following detailed description.

BACKGROUND OF THE INVENTION

The present invention relates to a pneumatic tire, and more particularly to a pneumatic tire for use in all seasons. A pneumatic tire designed for use in all seasons involves a trade-off between tire performance characteristics. For example, a pneumatic tire having good ice and snow traction generally has poor dry road traction and is usually much noisier than a tire designed to be used on dry road in the warmer seasons.

Applicants have discovered a tread pattern for a pneumatic tire which has acceptable ice and snow traction performance characteristics while at the same time having acceptable levels of performance for use on dry roads, thereby enabling the tire to be used in all seasons.

SUMMARY OF THE INVENTION

The present invention is directed to a pneumatic tire having a tread portion comprising a plurality of independent projections. Each independent projection has a configuration such that the perimeter of the projection is substantially greater than the diameter of a circle which circumscribes the projection. Preferably, the perimeter of each projection is at least five times the mean diameter of the circle which circumscribes the projection. There is provided in the tread portion a sufficient number of projections so that total perimetric length of projections divided by the total tread surface area is at least about 3.5 lineal inches per square inch.

DETAILED DESCRIPTION OF THE DRAWINGS

Figure 1:
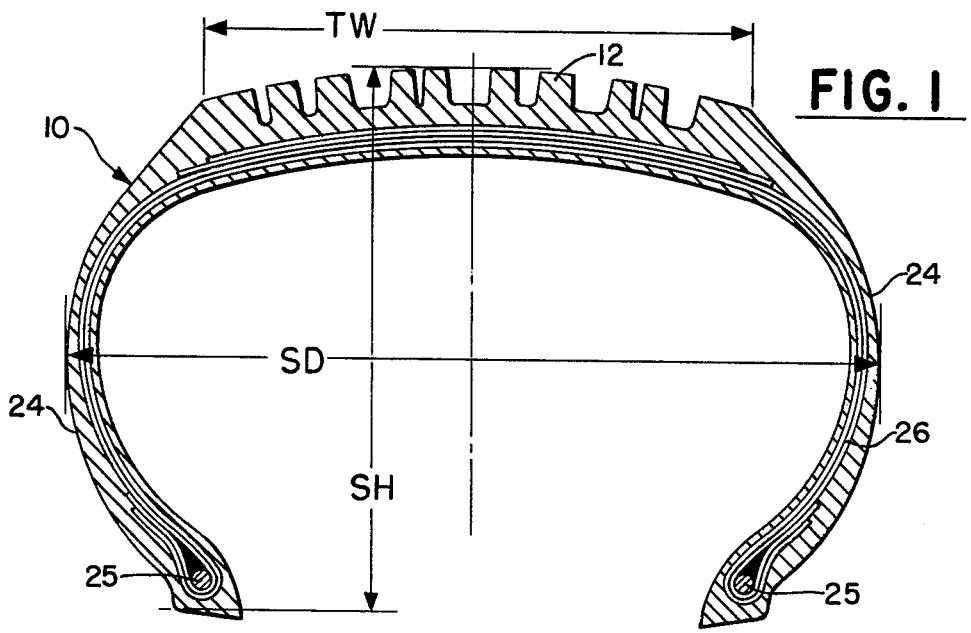
FIG. 1 is a cross-sectional view of a tire made in accordance with the present invention.
Figure 2:
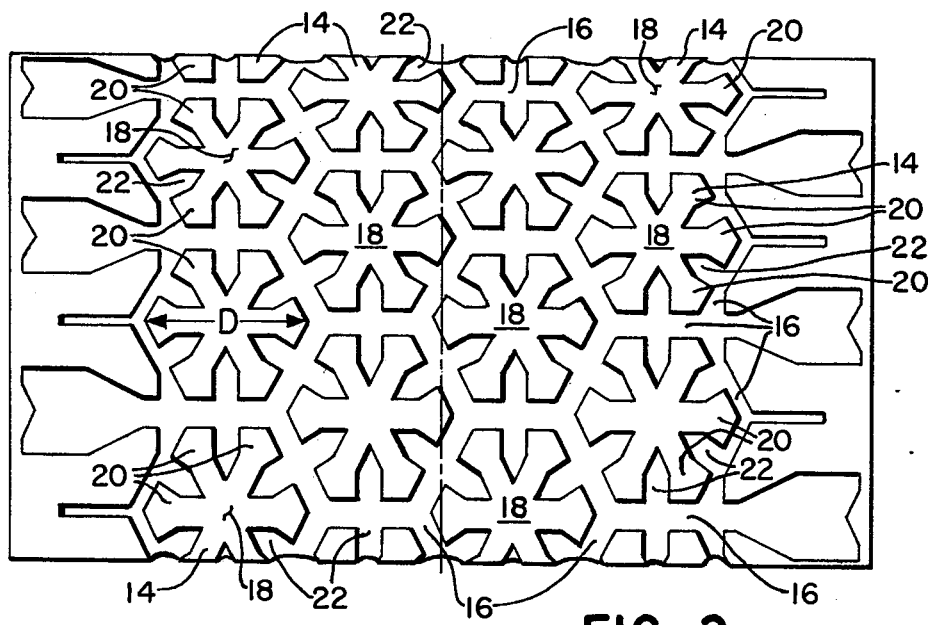
FIG. 2 is an enlarged fragmentary view of the tread portion of the tire according to FIG. 1.

With reference to FIGS. 1 and 2, there is illustrated a pneumatic tire 10 having a ground engaging portion 12 which extends circumferentially about the radially outer surface of the tire 10. The tread portion 12 comprises a plurality of independent projections 14 placed circumferentially about the tread portion 12 and spaced from each other so as to provide plurality of grooves 16 between adjacent projections 14. The grooves 16 have a cross-sectional width sufficiently large so that the grooves 16 do not close up at the tread contact surface when in the footprint of the tire, thereby providing water channeling passages in the tread portion.

The tire 10 generally comprises a pair of sidewall portions 24 which extend from each of the lateral ends of said tread portion 12 radially inward terminating in a pair of bead portions 25 respectively. A cord reinforced carcass ply structure 26 extends from bead portion to bead portion. Preferably, the cords of the ply layers of the carcass structure 26 form an angle with respect to the mid-circumferential plane CP of the tire from about 75° to about 90°.

Figure 3:
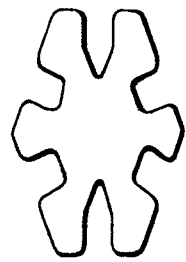
FIG. 3 is an enlarged view of a modified design of an independent projection of the tread portion of a tire made in accordance with the present invention.

The projections 14 generally have a central portion 18 and a plurality of limbs or projections 20 which extend outward from the central portion. Preferably, the projections 14 have a symmetrical configuration and the limbs 20 have substantially the same overall configuration. However, the projection may be asymetrical as illustrated in FIG. 3 or may take many other shapes and configurations not illustrated. The projections 14 have a configuration such that the perimeter P of the projection as viewed in a plane perpendicular to the tread surface, is substantially greater than its circumscribing circle as illustrated in FIG. 2. Generally, the perimeter P is at least five times the diameter D of the circumscribing circle, preferably the perimeter P is about six times that of diameter D and less than or equal to eight times the diameter D. In the particular embodiment illustrated the perimeter is approximately 5.67 times that of the circumscribed circle. In the embodiment illustrated, the independent projections 14 have an overall crystalline configuration, the limbs 20 being separated from each other by a cut-out portions 22. The cut-out portion 22 is to be distinguished from slits, blades or sipes normally found in the tread elements. The cut-out portions 22 are sufficiently large such that when in the footprint of the tire, the adjacent limbs 20 do not close up at the tread surface. For the purposes of this invention, the perimeter of any given element is the actual physical lineal distance measured about the element as viewed in the plane perpendicular to the tread surface excluding any blades or sipes that may extend into the projection.

The tread portion 12 is provided with sufficient number of projections 14 such that the average perimetric length of projections per square inch of tread surface area is at least 3.5 lineal inches per square inch of tread for the entire configuration of the tire, in the particular embodiment illustrated the average perimetric length of projection per square inch of tread portion is 4.25 inches per square inch. This assures a minimum number of biting edges in the tread portion for traction.

The tread width TW is at least sixty percent of the section diameter SD and in the particular embodiment illustrated the tread width is approximately sixty five percent of the section diameter SD. For the purposes of this invention, the tread width TW is the axial distance across the tread portion as measured from the footprint of the tire inflated to design inflation pressure and at rated load. The section diameter SD is the maximum axial distance measured parallel to the rotational axis of the tire measured from the axially outer surfaces of the tire exclusive of any indica or other markings. The aspect ratio of the tire, that is, the section height SH divided by the section diameter SD, ranges generally from about 60 to 85 and in the particular embodiment illustrated is about 75.

While certain representative embodiments and details have been shown for purpose of illustrating the invention, it will be apparent to those skilled in the art that various changes and modifications may be made therein without departing from the spirit or scope of the invention. For example, referring to FIG. 3, there is illustrated a modified shape of the independent projection.

I claim:

1. A pneumatic tire having a circumferentially extending ground-engaging tread portion characterized by said tread portion consisting essentially of a plurality of independent projections spaced about the circumference of the tire, each of said independent projections having a solid central portion and a plurality of limbs extending radially outward from said central portion, said limbs being spaced apart such that when in the footprint of the tire said limbs do not come in contact with adjacent limbs, the perimeter of each of said projections being at least five times the mean diameter of the circumscribing circle about said projection, said ground-engaging tread portion having a width at least 60% of the maximum section diameter of said tire, said tire having an aspect ratio from about 60 to 85, the total perimetrical length of said projections in said tread portion divided by the total area of the tread surface is at least 3.5 lineal inches per square inch.

2. A tire according to claim 1 wherein said independent projections have substantially identical configurations.

3. A tire according to claim 1 wherein said tire further comprises a carcass structure wherein the cords of said carcass ply structure form an angle with respect to the mid-circumferential centerplane of said tire from about 75° to 90°.

4. A tire according to claims 1, 2, or 3 wherein said independent projections have an overall outer configuration substantially that of a circle.

5. A tire according to claims 1, 2, or 3 wherein the perimeter of said projections is at least 6 times the diameter of the circumscribing circle.

6. A tire according to claims 1, 2, or 3 wherein the perimeter of each of said projections is about 5.67 times the diameter of the circumscribing circle.

* * * * *